Jan. 24, 1950 W. A. ST. GERMAIN 2,495,487
TOOL-LOCATING GAUGE
Filed July 28, 1945
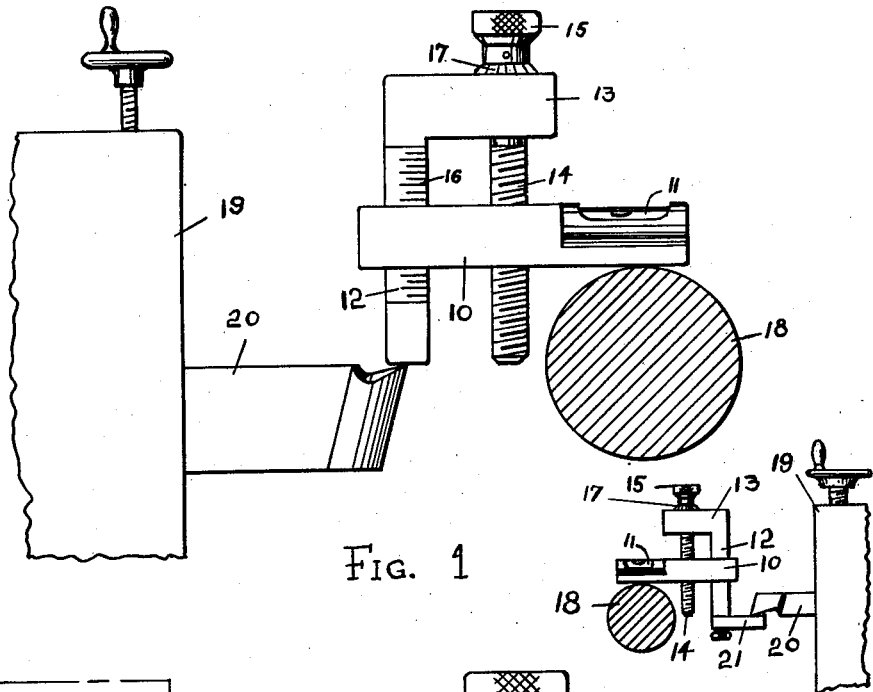
Fig. 1
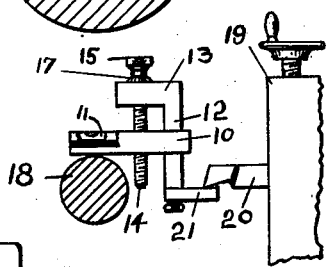
Fig. 2
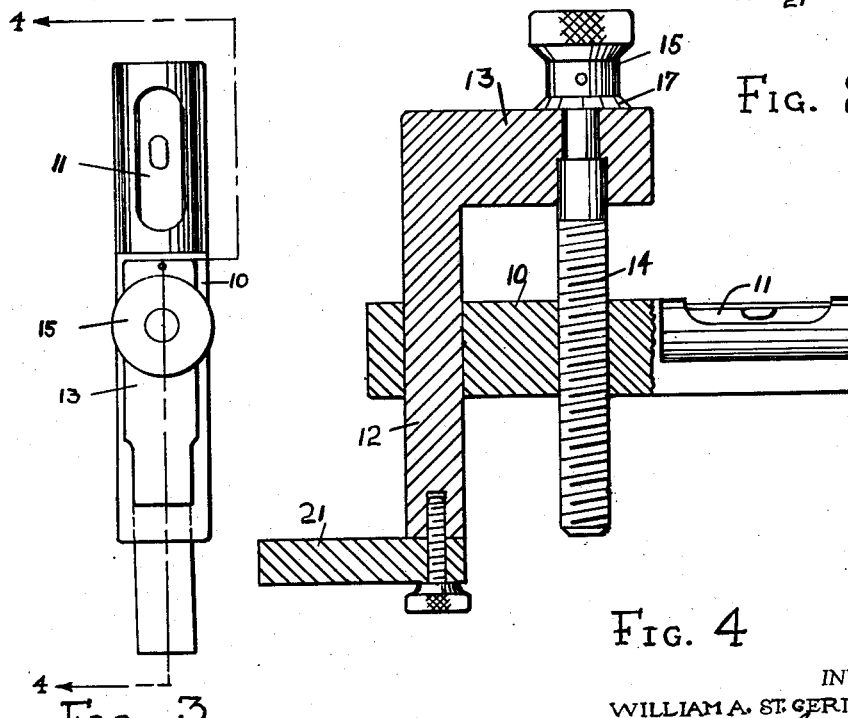
Fig. 3
Fig. 4
INVENTOR.
WILLIAM A. ST. GERMAIN
BY
ATTORNEY.

Patented Jan. 24, 1950

2,495,487

UNITED STATES PATENT OFFICE 2,495,487

TOOL-LOCATING GAUGE

William A. St. Germain, Littleton, Colo.

Application July 28, 1945, Serial No. 607,629

3 Claims. (Cl. 33—185)

This invention relates to a shop facility of gauge type particularly adapted for use to properly and precisely position the cutting elements of certain machine tools relative to the material to be worked thereby, and has as an object to provide a simple, convenient, and efficient gauge unit employable to altitudinally locate a tool cutting point relative to a determinable horizontal plane or line of material mounted to be worked by the tool.

A further object of the invention is to provide an improved tool-locating gauge especially adapted to facilitate altitudinal setting and adjustment of tools in lathes, turret lathes, screw machines, and the like, wherein the material to be worked is mounted for rotation about an axis and against the rigidly-supported tool.

A further object of the invention is to provide an improved tool-locating gauge designed to facilitate precise altitudinal setting and adjustment of a rigidly-supported tool relative to the axis of rotation of the material to be worked.

A further object of the invention is to provide an improved tool-locating gauge which is readily and precisely adjustable to manifest predetermined data in a form applicable to the control of altitudinal relation between a rigidly-supported tool and the axis of rotation of the material to be worked thereby.

A further object of the invention is to provide an improved tool-location gauge that is compact in form, sturdy of construction, simple in operation, efficient in use, practical in functional adaptation to a wide range of particular machine tools and machining operations, and susceptible of development as a precision instrument accurate within exceedingly close limits of tolerance.

With the foregoing and other objects in view, my invention consists in the construction, arrangement, and combination of elements hereinafter set forth, pointed out in my claims, and illustrated by the accompanying drawing, in which—

Figure 1 is a side elevation of a typically simple embodiment of the invention as positioned for practical use. Figure 2 is a side elevation, on a reduced scale, of the gauge shown in Figure 1 as modified and positioned for cooperation with a tool of alternative type. Figure 3 is a top plan view, on an enlarged scale, of the modified embodiment of the gauge according to Figure 2. Figure 4 is a section through and on the indicated line 4—4 of Figure 3.

In a great many machine tool operations, the material to be worked is mounted for rotation about an axis and power-rotated against and in engagement with a rigidly-supported tool whereby the material is shaped and formed to a circular sectional outline. Machines to accomplish such functions are variously designed for greater or less automatic performance, for variation in mounting of the material to be worked, and for different arrangements effective to feed the tool to and along the material being worked, a common characteristic of all such machines being the provision of some means whereby the cutting tool may be altitudinally adjusted to vary and position the tool point relative to a horizontal plane containing the rotational axis of the material engaged thereby. Contingent upon factors not pertinent for consideration herein, it is important in certain operations that the tool point engage the material being worked exactly in the horizontal plane of the material rotational axis, while in other operations it is important that the tool point engage the work at definite distances above or below said horizontal plane, and the instant invention provides improved and convenient means whereby the desired altitudinal relation of the tool point to the work may be had and precisely determined, within very exact limits, irrespective of the means available for securing and altitudinally adjusting the tool itself.

In the construction of the improved gauge as shown, the numeral 10 designates a leveling contact bar, of suitable hard, rigid material, such as steel, preferably a right parallelepiped in form, whereof at least the lower face is precision-finished to a true plane. At one of its ends, preferably in a longitudinal end-opening bore formed for such purpose, the bar 10 accommodates and operatively carries a bubble tube 11 of spirit level type whereof the line tangent to the apex of tube curvature is precisely fixed in parallel relation with the plane of the bar lower face, so that the indications of said bubble tube, readable through a window opening through the upper bar face, are made available to determine coincidence or deviation of the bar lower face relative to a true horizontal plane. Adjacent the end of the bar 10 remote from the tube 11, a straight bore of uniform angular cross section intersects and opens through the upper and lower faces of said bar in true perpendicular relation with said bar lower face to receive, slidably accommodate, and guide a straight, rigid stem 12, of angular cross section, reciprocable therethrough. The upper end of the stem 12 carries an integral or fixedly-associated head in the form of a bar 13 laterally and perpendicularly extending from said stem in overhanging parallelism with the midportion of the bar 10, and the free end portion of said bar 13 is traversed by a cylindrical bore, of any specific configuration suited to its purpose, disposed in axially-parallel relation with the stem 12 and adapted to receive and rotatably mount one end of a precision-threaded screw 14 thereby operatively supported in spaced, parallel relation with said stem 12 and in position to threadedly engage within and through a threaded bore formed for such purpose in the bar 10 between the tube 11 and the slideway for the stem 12.

The end of the screw 14 journaled in the bar 13 is arranged and operatively associated with its mounting bore in any suitable manner to hold said screw against axial displacement relative to said bar, as by means of the interengageable shoulders shown, or otherwise, and the journaled end of said screw projects from its accommodating bore outwardly and upwardly beyond the bar 13 upper surface to fixedly engage with a knurled cap or nut 15 whereby said screw may be manually rotated, the appropriate end of said element 15 bearing against the bar 13 upper surface to cooperate with the bore and screw arrangement in holding the screw against axial displacement relative to said bar.

As is readily apparent from the illustrations of the drawing and foregoing description, manual rotation of the screw 14 through the agency of the element 15 operates to move said screw axially through and relative to the bar 10 in a direction dependent upon the direction of screw rotation, the axial travel of said screw being productive of simultaneous and corresponding travel of the stem 12 through and relative to said bar. One face, at least, of the stem 12 is exteriorly calibrated in terms of linear measure, as indicated at 16, readable against the bar 10 lower face margin to visually mark the amount of stem 12 extension beyond the bar 10 lower face, and the end of the element 15 adjacent the bar 13 is circumferentially calibrated, as indicated at 17, with graduations readable against zero point or mark on the bar 13 upper surface, so that, the pitch of the threads on the screw 14 being suitably correlated with the calibrations 16 and 17, manual rotation of the screw 14 may be utilized to produce any desired precise extension of the stem 12 free end beyond the bar 10 lower face within the operative limits of the device and in accordance with the well-known principles of micrometer screws.

Practical use of the improved gauge is diagrammatically typified by Figures 1 and 2 of the drawing, wherein the material to be worked, suitably mounted for power-rotation about its axis, is represented at 18, an altitudinally-adjustable tool mount is shown at 19, and a conventional tool in position in the mount 19 is designated by the numeral 20. It being opportune to set the tool 20 with relation to the work 18, the diameter of said work at the section to be engaged by said tool is determined, by calipers, stock size, or the like, and the stem 12 free end extension beyond the bar 10 lower face is adjusted through rotation of the screw 14 to equal the half diameter of the work, plus or minus the amounts by which it is desired that the tool shall engage the work below or above the horizontal diametric plane through the work, whereafter the gauge, as so set, is positioned with the lower face of the bar 10 at the bubble tube end resting on the upper arc of the work, the free end of the stem 12 resting against the tool 20 cutting point, the screw 14 and stem 12 being in a vertical plane, and the tool mount altitudinal adjustment is then actuated to raise or lower the tool 20 until the bubble of the tube 11 centers to register horizontal disposition of the bar 10 lower surface and consequent desired altitudinal adjustment of the tool point relative to the work.

The embodiment of the improvement illustrated in Figure 1 and hereinabove described is adapted for the altitudinal location of tools whereof the cutting points are disposed upwardly of the tool and mount, but the device is susceptible of slight and convenient modification, when desired, to adapt it for use in the altitudinal location of tools whereof the points are directed downwardly of the tool and mount, such use being portrayed in Figure 2 and the pertinent modification being detailed in Figure 4. To adapt the device for use in the setting of downwardly-pointed tools, the only change or addition necessary is the provision of a threaded hole tapped into the squared free end of the stem 12 and the attachment, by means of a threaded, headed stud 21 removably and replaceably engageable with and in said hole, of a plane-surfaced, rigid finger 21 to and in perpendicular relation with said stem; said finger 21 bearing at one end of its upper surface directly against the stem 12 free end and projecting in parallel relation with the bar 10 outwardly from said stem and in a direction away from the screw 14 to extend, by means of its projecting upper surface, the gauging plane of the stem 12 free end into position for convenient engagement by and against the downwardly-directed point of a tool. When equipped with the finger 21, the improved gauge is used for the precise altitudinal adjustment of downwardly-pointed tools in the manner illustrated by Figure 2 and in the same way as hereinabove described, except for contact of the tool point against the finger 21 upper surface instead of directly against the stem 12 free end. The removable and replaceable mounting of the finger 21 relative to the other elements of the device facilitates adaptation of the single gauge unit for use with various specific tools and tool mountings, and is hence a feature of convenience, though it is to be understood that the gauging plane provided by said finger could be otherwise associated with and to extend the plane of the stem 12 free end without in any way departing from the spirit and principle of the invention.

The relatively small maximum dimension of the improved gauge in a direction axially of the material being worked particularly adapts the device for use in the precision setting of tools on screw machines and analogous machine tools, thereby materially enhancing the utility and advantage of the improvement.

Since many changes, variations, and modifications in the specific form, construction, and arrangement of the elements shown and described may be had without departing from the spirit of the invention, I wish to be understood as being limited solely by the scope of the appended claims, rather than by any details of the illustrative showing and foregoing description.

I claim as my invention:

1. A tool-locating gauge comprising a straight bar presenting a true plane under surface engageable tangentially against and to extend laterally from the upper arc of a cylindrical work piece, a level-determining bubble tube in one end and visible through the upper surface of said bar in operative correlation with the bar under surface, a cross-sectionally-angular slideway intersecting said bar adjacent the end remote from said bubble tube in perpendicular relation with the bar under surface, an L-shaped gauge member formed with a calibrated, cross-sectionally-angular longer leg reciprocably and non-rotatably engaged through said slideway to position the member shorter leg in spacedly-parallel, overhanging relation with the upper surface of the bar portion between the bubble tube and slideway, and manually - actuatable, micrometer - type, screw means adjustably interconnecting the member shorter leg free end and the bar midportion in parallel relation with the member longer leg.

2. A tool-locating gauge comprising a straight bar presenting a true plane under surface engageable tangentially against and to extend laterally from the upper arc of a cylindrical work piece, a level-determining bubble tube in one end and visible through the upper surface of said bar in operative correlation with the bar under surface, a cross-sectionally-angular slideway intersecting said bar adjacent the end remote from said bubble tube in perpendicular relation with the bar under surface, an L-shaped gauge member formed with a calibrated, cross-sectionally-angular longer leg reciprocably and non-rotatably engaged through said slideway to position the member shorter leg in spacedly-parallel, overhanging relation with the upper surface of the bar portion between the bubble tube and slideway, a manually-actuatable, micrometer-type screw threadedly engaging through the bar midportion in spaced parallelism with said member longer leg, and a rotative, axially-fixed connection between the manipulating end of said screw and the free end of the member shorter leg.

3. A tool-locating gauge comprising a straight bar presenting a true plane under surface engageable tangentially against and to extend laterally from the upper arc of a cylindrical work piece, a level-determining bubble tube in one end and visible through the upper surface of said bar in operative correlation with the bar under surface, a cross-sectionally-angular slideway intersecting said bar adjacent the end remote from said bubble tube in perpendicular relation with the bar under surface, an L-shaped gauge member formed with a calibrated, cross-sectionally-angular longer leg reciprocably and non-rotatably engaged through said slideway to position the member shorter leg in spacedly-parallel, overhanging relation with the upper surface of the bar portion between the bubble tube and slideway, a manually-actuatable, micrometer-type screw threadedly engaging through the bar midportion in spaced parallelism with said member longer leg, a rotative, axially-fixed connection between the manipulating end of said screw and the free end of the member shorter leg, and an adapter finger removably and replaceably associated with the member longer leg free end to define a plane spacedly paralleling the bar under surface and extending outwardly from the associated leg end away from the leg-paralleling screw.

WILLIAM A. ST. GERMAIN.

REFERENCES CITED

The following references are of record in the file of this patent:

UNITED STATES PATENTS

| Number | Name | Date |
| --- | --- | --- |
| 273,022 | Buss | Feb. 27, 1883 |
| 304,389 | Willey et al. | Sept. 2, 1884 |
| 611,625 | Goddard | Oct. 4, 1898 |
| 1,243,545 | Nefedov | Oct. 16, 1917 |
| 1,265,431 | Costello | May 7, 1918 |
| 1,686,318 | Gallasch | Oct. 2, 1928 |
| 1,749,980 | Loeser | Mar. 11, 1930 |
| 1,824,153 | Jacobs | Sept. 22, 1931 |

FOREIGN PATENTS

| Number | Country | Date |
| --- | --- | --- |
| 402,262 | France | Apr. 24, 1909 |